United States Patent
Riguer

(10) Patent No.: US 10,319,063 B2
(45) Date of Patent: Jun. 11, 2019

(54) SYSTEM AND METHOD FOR COMPACTING COMPRESSED GRAPHICS STREAMS FOR TRANSFER BETWEEN GPUS

(71) Applicant: ATI TECHNOLOGIES ULC, Markham (CA)

(72) Inventor: Guennadi Riguer, Markham (CA)

(73) Assignee: ATI Technologies ULC, Markham (CA)

(*) Notice: Subject to any disclaimer, the term of this patent is extended or adjusted under 35 U.S.C. 154(b) by 43 days.

(21) Appl. No.: 15/441,932

(22) Filed: Feb. 24, 2017

(65) Prior Publication Data
US 2018/0247387 A1    Aug. 30, 2018

(51) Int. Cl.
G06T 1/20    (2006.01)
G06T 1/60    (2006.01)
G09G 5/36    (2006.01)
G06F 3/06    (2006.01)

(52) U.S. Cl.
CPC .............. *G06T 1/20* (2013.01); *G06F 3/064* (2013.01); *G06F 3/0608* (2013.01); *G06F 3/0647* (2013.01); *G06F 3/0683* (2013.01); *G06T 1/60* (2013.01); *G09G 5/363* (2013.01)

(58) Field of Classification Search
CPC ............. G06T 1/20; G06T 1/60; G09G 5/363
USPC ................................ 345/501, 502, 530, 555
See application file for complete search history.

(56) References Cited

U.S. PATENT DOCUMENTS

| | | | |
|---|---|---|---|
| 7,616,206 B1 | 11/2009 | Danilak | |
| 8,736,617 B2* | 5/2014 | Lew | G06T 1/20 345/502 |
| 8,754,900 B2* | 6/2014 | Koneru | G06F 3/14 345/537 |
| 2007/0257935 A1 | 11/2007 | Koduri et al. | |
| 2010/0070822 A1* | 3/2010 | Leung | H04L 1/007 714/752 |
| 2013/0293565 A1* | 11/2013 | Arvo | G06T 9/00 345/589 |
| 2014/0085314 A1* | 3/2014 | Steinke | G06F 3/14 345/473 |
| 2014/0173674 A1* | 6/2014 | Wolman | H04N 21/25 725/116 |

* cited by examiner

*Primary Examiner* — Jacinta M Crawford

(57) ABSTRACT

In a processing system including a plurality of graphics processing units (GPUs), the GPUs transfer compressed graphics streams composed of blocks of graphics data to one another. Some blocks of a compressed graphics stream, or parts thereof, may contain both compressed graphics data and meaningless data (referred to as data structure padding, or padding) that is used to align the graphics data, and some blocks may contain only padding. Before transferring a compressed graphics resource from one GPU to another GPU, the sending GPU compacts the compressed graphics resource by filtering out padding from the compressed graphics stream prepared for the transfer.

20 Claims, 10 Drawing Sheets

SYSTEM AND METHOD FOR COMPACTING COMPRESSED GRAPHICS STREAMS FOR TRANSFER BETWEEN GPUS

BACKGROUND

Description of the Related Art

Graphics processing units (GPUs) are used in a wide variety of processors to facilitate the processing and rendering of objects for display. The GPU includes a plurality of processing elements to execute instructions, thereby creating images for output to a display. In certain applications, a processing system employs multiple GPUs that transmit and receive information from each other. As the amount of data transmitted between GPUs increases, so does the resource overhead required to effectuate the transfer from one GPU to another. In applications such as virtual reality, where image resolution and refresh rates are increasing, the cost of transferring resource data from one GPU to another grows proportionally with image resolution due to a limited bus bandwidth. Large overhead of resource transfers degrades overall performance, reduces performance scaling with the number of used GPUs and could make such transfers prohibitively expensive. However, block-based memory bandwidth compression used in modern GPUs does not reduce the footprint of the resource data for transfer bandwidth reduction.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-10 illustrate techniques for parsing metadata from compressed graphics resources, compacting the compressed graphics resources into a stream and interleaving the metadata, and transferring the compacted compressed graphics stream with interleaved metadata from one GPU to another GPU in a processing system. In a processing system having multiple GPUs, a GPU may transfer a compressed stream of graphics data to another GPU via a bus. For example, in a multi-GPU system for virtual reality, one GPU processes images for a right eye, and another GPU processes images for a left eye. One of the GPUs transfers streams of graphics data from its rendered eye image to each other GPU that has a VR headset attached. As video resolutions and refresh rates increase, the large amount of graphics data being transferred between GPUs may result in degraded multi-GPU system performance. In order to reduce the amount of graphics data being transferred between GPUs, the compressed graphics resource is compacted during the transfer.

To illustrate, a stream of graphics data may be compressed and further compacted according to one or more compression methods, thus reducing the amount of data being transferred, and then decompacted and optionally decompressed by a receiving GPU according to a compaction and compression method indicated by metadata that is either interleaved with the compressed graphics stream or transmitted in a separate metadata stream. The compressed graphics stream is composed of blocks of graphics data. The block-based compression of resource for bandwidth reduction does not reduce the memory footprint. In these types of compression schemes, some blocks of a compressed graphics stream, or parts thereof, may contain both compressed graphics data and meaningless data (referred to as data structure padding, or padding) that is used to align the graphics data, and some blocks may contain only padding. Before transferring a compressed graphics resource from one GPU to another GPU, the sending GPU compacts the compressed graphics resource by filtering out padding from the compressed graphics stream prepared for the transfer. By transferring the compacted compressed graphics stream between GPUs, the amount of data being transferred between GPUs is reduced without compromising image quality, and existing GPU compression mechanisms are leveraged.

Figure 1:
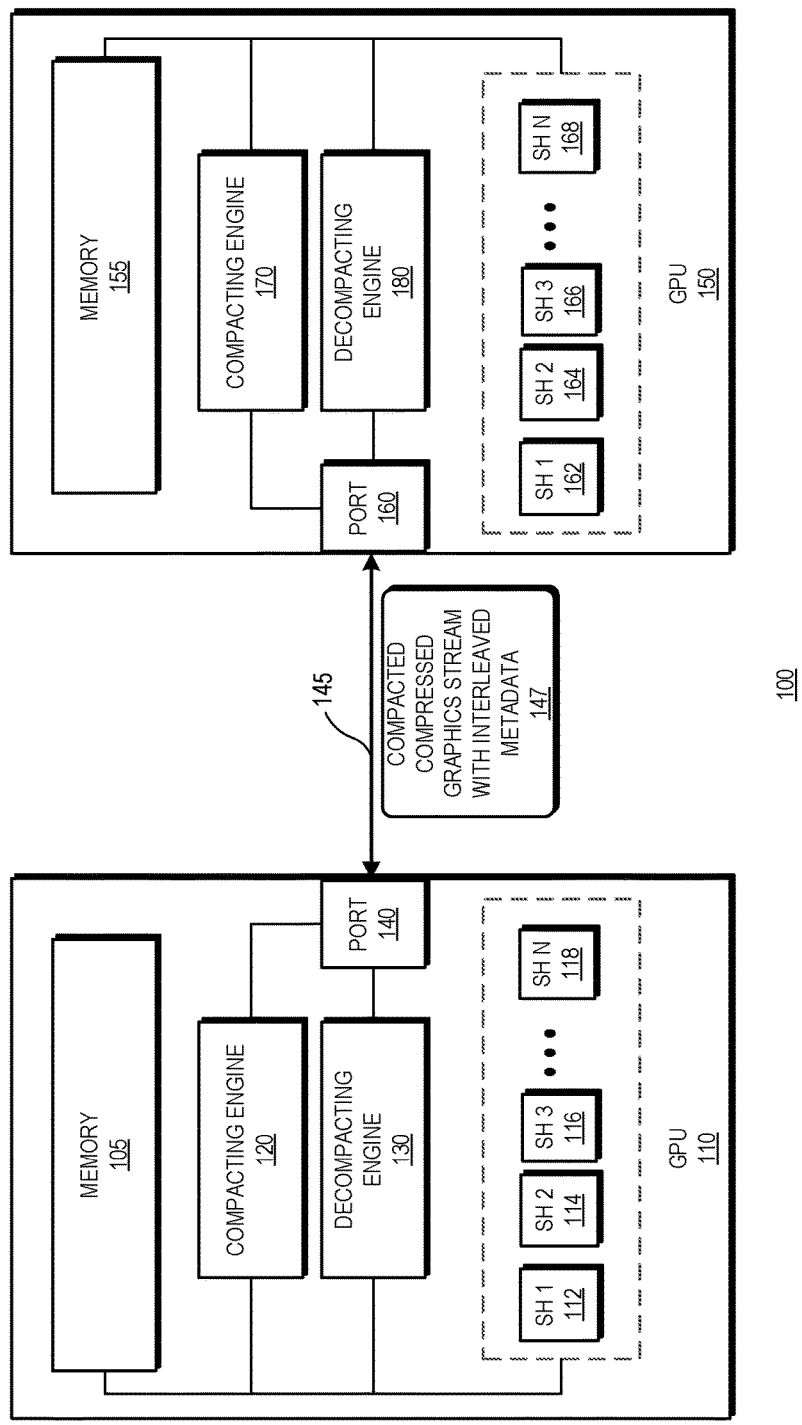
FIG. 1 is a block diagram of a processing system having multiple GPUs that compact compressed graphics streams for transfer from one GPU to another GPU in accordance with some embodiments.

FIG. 1 illustrates an example of a processing system 100 having multiple GPUs that are configured to compact compressed graphics streams for transfer from one GPU to another GPU and decompact received compacted compressed graphics streams in accordance with some embodiments. The processing system 100 can be employed in any of a variety of devices, such as a head-mounted display, personal computer, mobile device such as a smartphone, tablet, a video player, a video game console, a casino gaming device and the like. To support compacting, transfer, and decompacting of compressed graphics streams, the processing system 100 comprises a first GPU 110 and a second GPU 150 connected by a bus 145. GPU 110 includes a memory 105, a compacting engine 120, a decompacting engine 130, a plurality of processing elements that in some embodiments could be referred to as shaders SH1 (112), SH2 (114), SH3 (116), . . . SHN (118), and a port 140. Similarly, GPU 150 includes a memory 155, a compacting engine 170, a decompacting engine 180, a plurality of shaders SH1 (162), SH2 (164), SH3 (166), . . . SHN (168), and a port 160.

Memory 105 and memory 155 are each memory devices generally configured to store data, and therefore may be random access memory (RAM) memory modules, non-volatile memory devices (e.g., flash memory), and the like. In addition, the processing system 100 may include other memory modules arranged in a memory hierarchy, such as additional caches not illustrated in FIG. 1.

Among other data, memory 105 and memory 155 are configured to store compressed graphics resources (not shown). Each compressed graphics resource is composed of blocks of compressed graphics data with associated per-block compression metadata. Compressed graphics data is graphics data that has been replaced with data that uses fewer bits to convey the same or similar information. For example, white space in a graphics image can be replaced with a value that indicates how much white space there is. As another example, color data may be compressed by determining the most frequently used colors in an image and adjusting the remaining colors in the image to match the most frequently used colors such that the colors used in the compressed image are drawn from a more limited palette than the original image. As another example, depth data, which is used to generate 2D representations of 3D scene surfaces, may be compressed using standard coding algorithms. As yet another example, vertex data, which describes the position of a point in 2D or 3D space, may be compressed according to known compression methods.

The memory 105 and memory 155 also store metadata associated with the compressed graphics data that indicates the compression method used to compress each of color, depth, vertex data, or other data. The stored metadata is typically either interleaved with the compressed graphics data or stored as separate associated data. In some embodiments, metadata indicating the compression method is stored in a separate memory location that is associated with the compressed graphics data. Thus, transmission of the compressed graphics data is accompanied by transmission of the metadata for the compressed graphics data.

To facilitate the transfer of block-compressed graphics resources between GPUs while minimizing the amount of data being transferred across the bus 115, GPU 110 and GPU 150 each include a compacting engine, 120 and 170, respectively. The compacting engines 120 and 170 are modules configured to compact the compressed graphics resources by filtering out (i.e., removing) padding before transmitting the compressed graphics streams from one GPU (e.g., GPU 110) to another GPU (e.g., GPU 150). Because the padding does not contain meaningful data used in rendering images, removing the padding does not compromise the quality of the images. By removing the padding, the quantity of data that is transmitted between GPUs 110 and 150 is reduced, so that transfers from one GPU to another GPU require lower resource overhead.

The compacting engines 120 and 170 are configured to separate, or parse, metadata from compressed graphics resources, compact the compressed graphics streams by filtering out padding from the memory blocks of the compressed graphics streams according to the metadata, reformat or otherwise process the metadata, and interleave the parsed metadata into the compacted compressed graphics streams. The compacted compressed graphics streams with interleaved metadata are output to respective ports 140 and 160, from which they are transmitted between GPU 110 and GPU 150 across the bus 145. In some embodiments, memory apertures mapped into a peer GPU address space and configured to send, store, and receive compacted compressed graphics streams with interleaved metadata across the bus 115 that connects GPU 110 and GPU 150 could be used in place of the dedicated data ports 140 and 160. In some embodiments, instead of interleaving the metadata into the compacted compressed graphics streams, the compacting engine 120, 160 transmits the metadata in a separate stream associated with the compacted compressed graphics stream. In other embodiments, functionality of compacting engines or parts thereof could be implemented in software or firmware using programmable processing units.

The ports 140 and 160 receive the compacted compressed graphics streams and send them to the decompacting engines 130 and 180, respectively. The decompacting engines 130 and 180 are configured to parse the metadata from the compacted compressed graphics streams, reinsert padding as needed for data alignment (i.e., decompact the compacted compressed graphics streams), and decompress the compressed graphics streams according to the decompression method(s) indicated by the metadata.

Each of the shaders 112-118 and 162-168 is a processing element configured to perform specialized calculations and execute certain instructions for rendering computer graphics. For example, shaders 112-118 and 162-168 may compute color and other attributes for each fragment, or pixel, of a screen. Thus, shaders 112-118 and 162-168 can be two-dimensional (2D) shaders such as pixel shaders, or three-dimensional shaders such as vertex shaders, geometry shaders, or tessellation shaders, or any combination thereof. As described further herein, the shaders work in parallel to execute the operations required by the graphics streams.

To illustrate, a compressed graphics resource (not shown) is stored at memory 105 of GPU 110. The compressed graphics resource is to be transferred to GPU 150. Prior to transfer, the compressed graphics resource is sent to the compacting engine 120. The compacting engine 120 parses metadata of the compressed graphics resource, filters out any padding from the resource, and forms the compressed graphics stream. If necessary, metadata is reformatted for transmission.

In some embodiments, the compacting engine 120 embeds graphics resource identifying information into the metadata resource stream to communicate to the receiving GPU the type of resource that is being transferred. In some embodiments, a driver (not shown) running on the host (not shown) uploads matching resource configurations to both the sending and receiving GPUs to configure the compaction and decompaction engines. In some embodiments, the sending GPU sends a resource configuration through an independent communication, e.g., by sending configuration register writes to the receiving GPU. In some embodiments, a hardware or software mechanism applies a mutual exclusion condition to synchronize the configurations of the compacting and decompacting engines for each graphics data transfer between GPUs.

The compacting engine 120 then interleaves the metadata with the compacted compressed graphics stream to form a compacted compressed graphics stream with interleaved metadata 147. Optionally, the compressed graphics stream, metadata, or combined compacted compressed graphics stream with interleaved metadata could be further compressed. The compacting engine 120 transfers the compacted compressed graphics stream with interleaved metadata 147 to the port 140. The port 140 transfers the compacted compressed graphics stream with interleaved metadata 147 from the GPU 110 across the bus 145 to the GPU 150.

The port 160 of the GPU 150 receives the compacted compressed graphics stream with interleaved metadata 147 from the bus 145 and transfers the compacted compressed graphics stream with interleaved metadata 147 to the decompacting engine 180 of the GPU 150. The decompacting engine 180 receives the compacted compressed graphics stream with interleaved metadata 147 and parses the metadata from the stream. Optionally, if additional stream compression was used, the stream or parts thereof are decompressed. The decompacting engine 180 then inserts padding, as needed for data alignment, into the stream. The decompacting engine 180, decompacts the compressed resource data according to the original resource layout, and stores the decompacted compressed graphics resource and its metadata in GPU memory 155. The original resource memory layout with necessary padding is determined based on the transferred metadata. Optionally, the transferred resource could be decompressed prior to storage in memory 155. In other embodiments, functionality of decompacting engines or part thereof could be implemented in software or firmware using programmable processing units.

Figure 2:
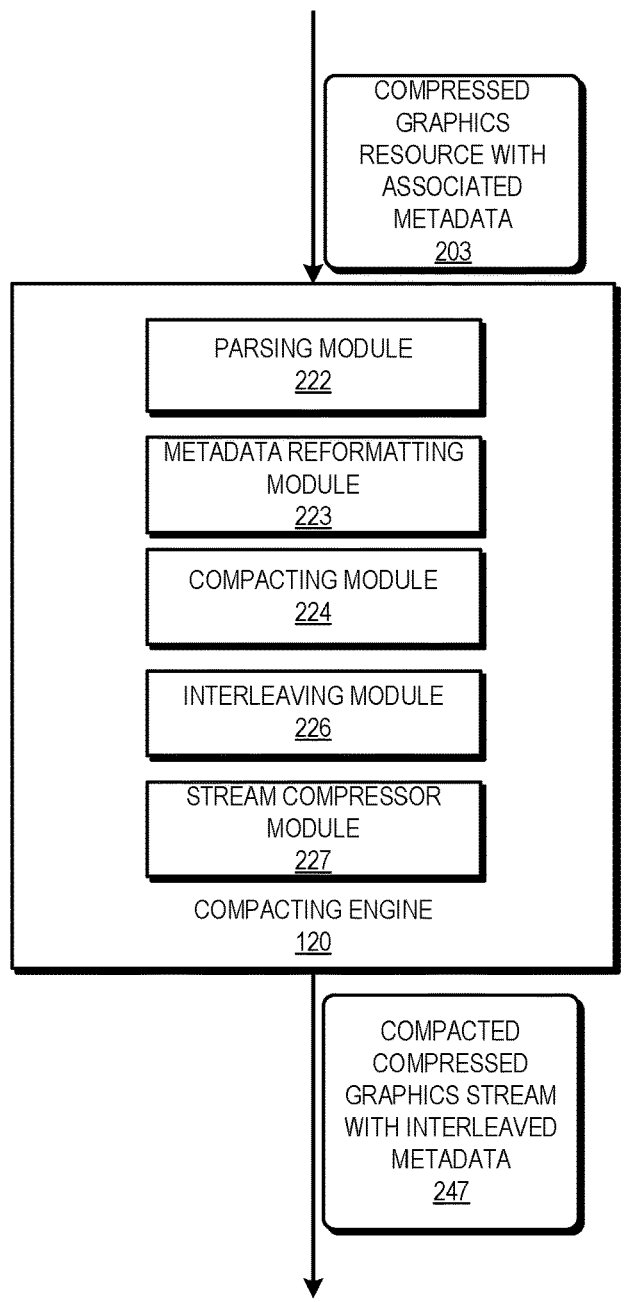
FIG. 2 is a block diagram of a compacting engine of a GPU of FIG. 1 that compacts compressed graphics streams and interleaves metadata for transfer from one GPU to another GPU in accordance with some embodiments.

FIG. 2 illustrates an example of the compacting engine 120 of GPU 110 of FIG. 1 that compacts compressed graphics streams and interleaves metadata for transfer to another GPU in accordance with some embodiments. The compacting engine 120 includes a parsing module 222, a compacting module 224, and an interleaving module 226. In some embodiments, the compacting engine 120 may also optionally include a metadata reformatting module 225 and/or a stream compressor module 227 for data and metadata stream compression.

A compressed graphics resource with interleaved metadata 203 is received by the compacting engine 120 and enters the parsing module 222. The parsing module 222 is configured to retrieve metadata of the transmitted compressed graphics resource. According to the resource metadata, the parsing module 222 sends the compressed graphics resource data to the compacting module 224. Optionally, the metadata re-formatting module 223 may alter the resource metadata for transmission. The compacting module 224 is configured to remove padding from the blocks of data of the compressed graphics resource, and to remove any blocks containing only padding from the compressed graphics resource. Thus, after being compacted by the compacting module 224, the resulting compressed graphics stream contains only valid compressed graphics data, without any padding. The compacted compressed graphics stream is received by the interleaving module 226. The interleaving module 226 is configured to interleave the metadata that was parsed and stored by the parsing module 222 into the compacted compressed graphics stream. The compacting engine 120 transfers the resulting compacted compressed graphics stream with interleaved metadata 247 to the port (not shown). In some embodiments, the interleaving module 226 is configured to create a separate stream of the metadata that was parsed and stored by the parsing module 222. In such embodiments, the compacting engine 120 transfers the compacted compressed graphics stream (not shown) and associated compressed metadata stream (not shown) to the port (not shown). In some embodiments, the compacted data stream, metadata, or compacted data stream with interleaved metadata may be further compressed by the stream compressor module 227. In some embodiments, the stream compressor module 227 receives the compacted compressed graphics stream from the compacting module 224, and further compacts the data stream before sending it to the interleaving module 226.

Figure 3:
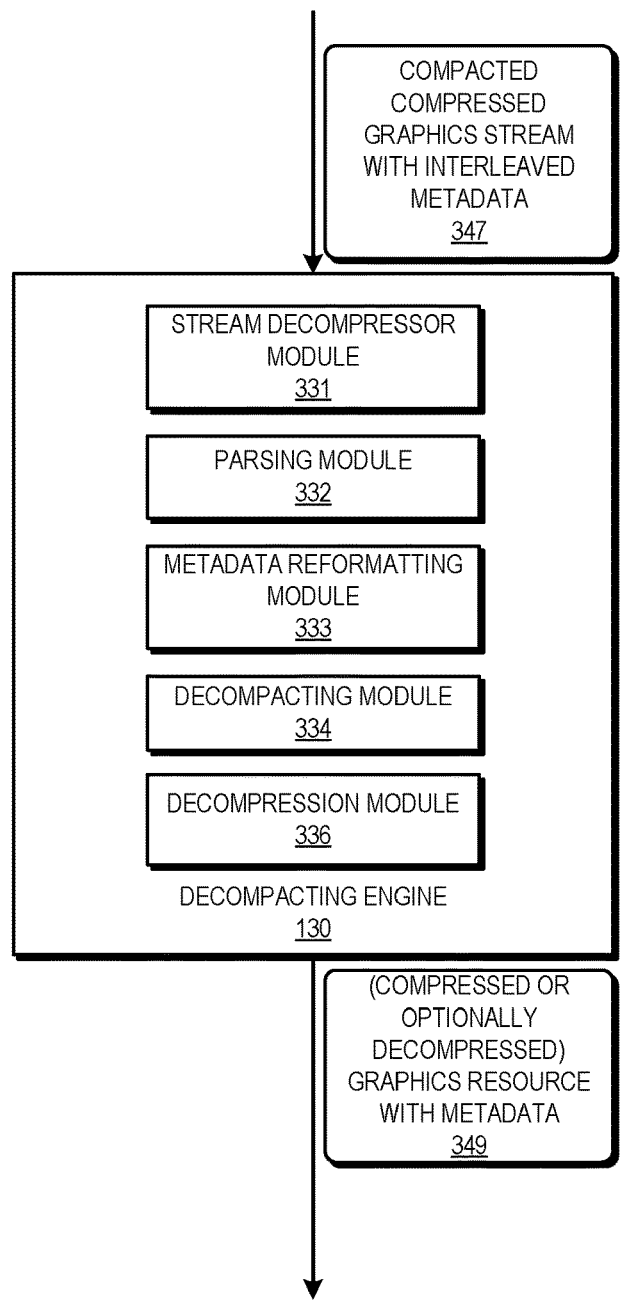
FIG. 3 is a block diagram of an example of a decompacting engine of a GPU of FIG. 1 that decompacts and optionally decompresses graphics streams received at a GPU from another GPU in accordance with some embodiments.

FIG. 3 illustrates an example of the decompacting engine 180 of GPU 150 of FIG. 1 that decompacts compacted compressed graphics streams with interleaved metadata 347 that have been received from another GPU in accordance with some embodiments. The decompacting engine 180 includes a parsing module 332, a decompacting module 334, and a decompression module 336. In some embodiments, the decompacting engine 180 optionally further includes a stream decompressor module 331 and a metadata reformatting module 333.

A compacted graphics stream with interleaved metadata 347 is received by the decompacting engine 180 and enters the parsing module 332. Optionally, if compressed on transmission, the compacted graphics stream, or its metadata, or both are decompressed. The parsing module 332 is configured to separate any metadata that is interleaved with the received compacted compressed graphics stream. The parsing module 332 forwards the metadata and the compacted compressed graphics stream to the decompacting module 334. In some embodiments, an optional metadata re-formatting module 333 processes metadata to restore in the metadata to its original form prior to forwarding to decompacting module 334. The decompacting module 334 is configured to insert padding into the blocks of data of the compacted compressed graphics stream as needed for data alignment based on the metadata. Thus, after being decompacted by the decompacting module 334, the compressed graphics resource contains both valid compressed graphics data and meaningless bits for data alignment. In some embodiments, the compressed graphics stream is received by the decompression module 336. The decompression module 336 is configured to receive the metadata that was parsed and processed by the parsing module 332 and re-formatting module 333, and decompress the compressed graphics stream using a decompression method indicated by the metadata. The decompacting engine 130 stores the resulting decompacted and optionally decompressed graphics resource 349 to the memory 155.

Figure 4:
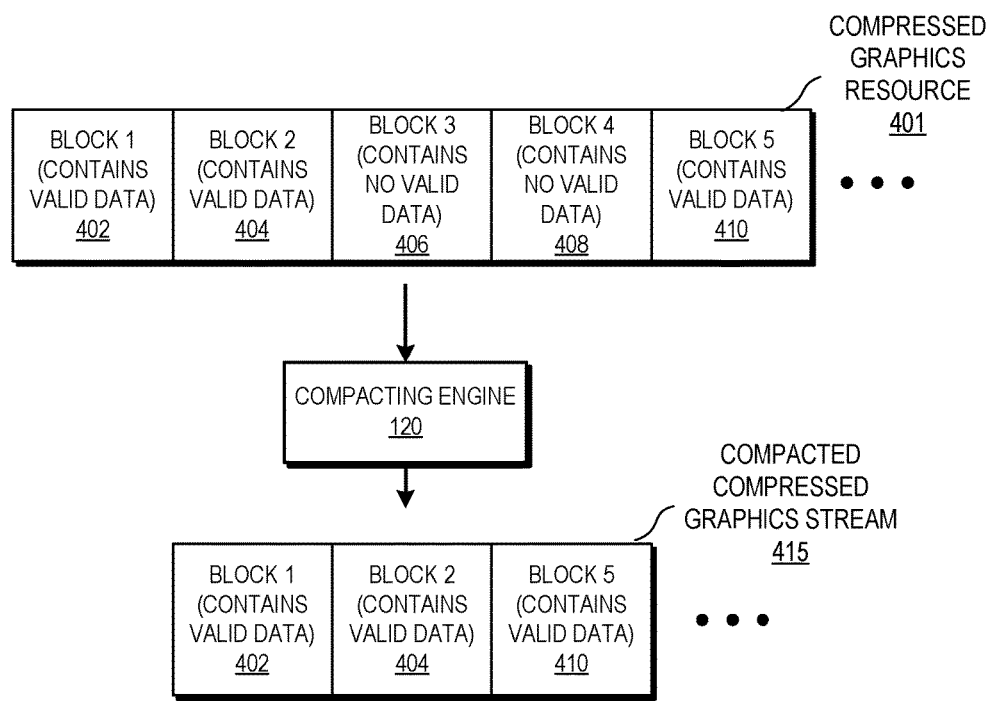
FIG. 4 is a block diagram of an example of a compacting module of a compacting engine of FIG. 2 of a GPU compacting a compressed stream of graphics data in accordance with some embodiments.

FIG. 4 illustrates an example of a compacting module 120 of a GPU compacting a compressed graphics resource 402 in accordance with some embodiments. The compressed graphics resource 402 includes a plurality of data blocks, some of which contain valid data, and some of which contain only padding and no valid data. Thus, block 1 (402) contains only valid data, block 2 (404) contains only valid data, block 3 (406) contains only padding and no valid data, block 4 (408) contains only padding and no valid data, and block 5 (410) contains only valid data. The compressed graphics resource 402 enters the compacting engine 120, which compacts the compressed graphics resource 402 by removing data blocks that do not contain valid data. Thus, the compacting engine 120 compacts the compressed graphics resource 402 such that the resulting compacted compressed graphics stream 415 includes block 1 (402), block 2 (404), and block 5 (410), but does not include block 3 (406) or block 4 (408), which contained only padding and no valid data. In some embodiments, the compacting engine 120 removes padding from data blocks that contain both valid data and padding, such that the resulting compacted compressed graphics stream includes only the valid data from the compressed data blocks.

Figure 5:
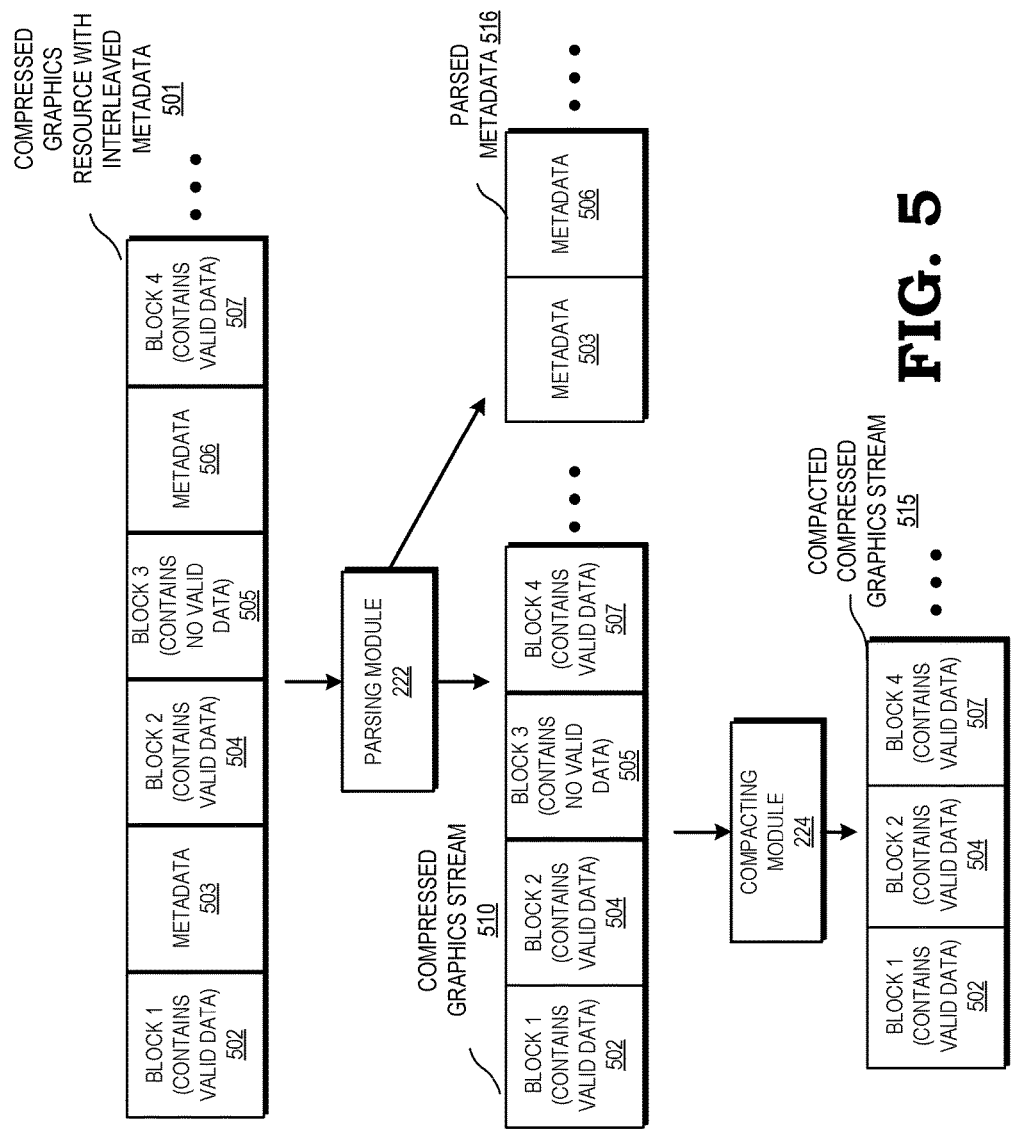
FIG. 5 is a block diagram of an example of a parsing module of a compacting engine of FIG. 2 parsing metadata from a compressed stream of graphics data and a compacting module compacting a compressed stream of graphics data from which metadata has been parsed in accordance with some embodiments.

FIG. 5 illustrates an example of a parsing module 222 parsing metadata 516 from a compressed graphics resource with interleaved metadata 501 and a compacting module 224 compacting a compressed stream of graphics data 510 from which metadata 516 has been parsed in accordance with some embodiments. The compressed graphics resource with interleaved metadata 501 includes a plurality of blocks of graphics data, some of which contain only padding, and some of which contain only valid data, as well as blocks of metadata indicating, inter alia, the compression method used to compress the graphics stream and the decompression method which is to be used to decompress the graphics stream. The compressed graphics stream with interleaved metadata 501 includes block 1 (502), which includes only valid graphics data; metadata 503; block 2 (504), which contains only valid graphics data; block 3 (505), which contains only padding and does not contain any valid graphics data; metadata 506; and block 4 (507), which contains only valid graphics data.

The compressed graphics resource with interleaved metadata 501 enters the parsing module 222 of the compacting engine (not shown). The parsing module 222 separates the blocks of metadata 503 and 506 from the blocks of the compressed graphics stream, resulting in a compressed graphics stream 510 and parsed metadata 516. The parsed metadata 516 is stored in the parsing module 222. The compressed graphics stream 510, which includes block 1 (502), block 2 (504), block 3 (505), and block 4 (507), is passed to the compacting module 224. The compacting module 224 compacts the compressed graphics stream 510 by filtering out the padding from the blocks of compressed graphics data. Thus, the compacting module 224 removes block 3 (505), which contains only padding and does not contain any valid graphics data, from the compressed graphics stream 510. The resulting compacted compressed graphics stream 515 includes block 1 (502), block 2 (504), and block 4 (507). In some embodiments, the compacting module 224 removes padding from data blocks that contain both valid data and padding, such that the resulting compacted compressed graphics stream includes only the valid data from the compressed data blocks. In some embodiments, the compacting module 224 removed some, but not all, of the padding from the compressed graphics stream 515.

Figure 6:
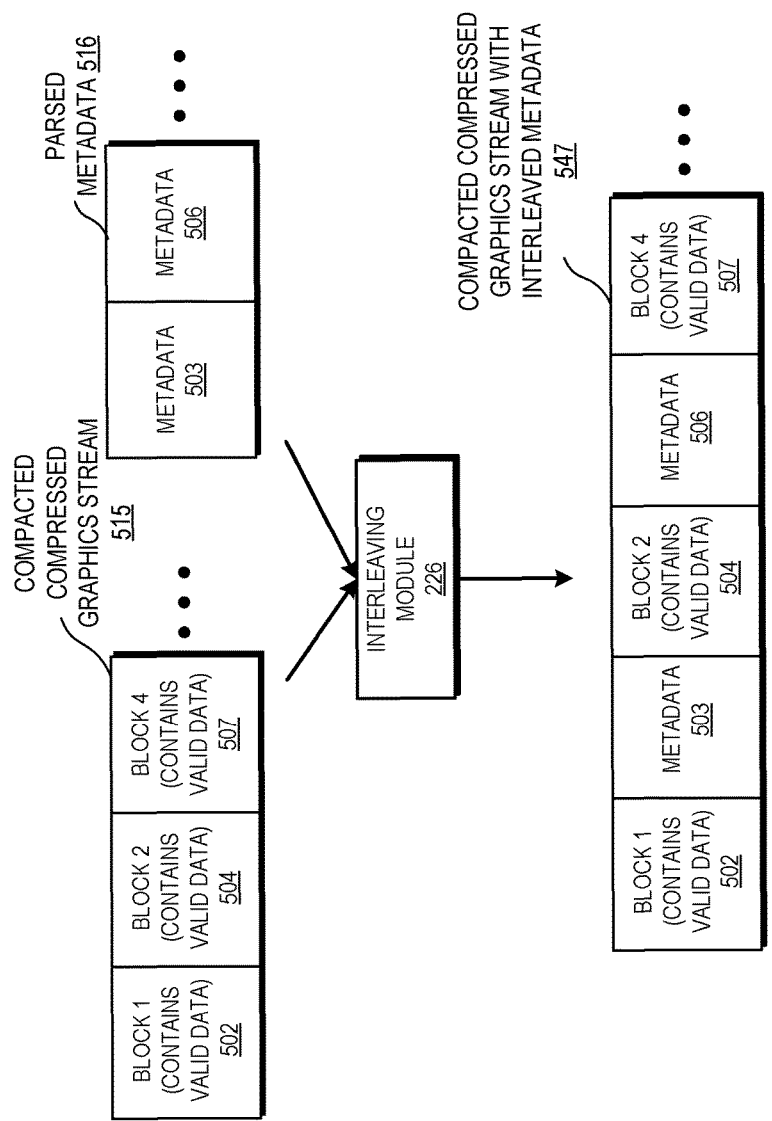
FIG. 6 is a block diagram of an example of an interleaving module of a compacting engine of FIG. 2 interleaving parsed metadata into a compacted compressed stream of graphics data in accordance with some embodiments.

FIG. 6 illustrates an example of an interleaving module 226 of the compacting engine (not shown) interleaving parsed metadata 516 into a compacted compressed stream of graphics data 515 in accordance with some embodiments. The compacted compressed graphics stream 515 includes block 1 (502), block 2 (504), and block 4 (507), each of which contains only valid graphics data. The parsed metadata 516 includes metadata 503 and metadata 506, which were previously parsed from the compressed graphics stream with interleaved metadata (not shown) and stored at the parsing module (not shown). The interleaving module 226 receives the compacted compressed graphics stream 515 and the parsed metadata 516, and interleaves the blocks of the metadata 516 with the graphics data blocks of the compacted compressed graphics stream 515. The resulting compacted compressed graphics stream with interleaved metadata 547 includes block 1 (502), metadata 503, block 2 (504), metadata 506, and block 4 (507). In another embodiment, the compacted compressed graphics stream with interleaved metadata 547 includes metadata for all original data blocks from compressed graphics resource, including metadata for blocks that were removed by compacting module.

Thus, the compacted compressed graphics stream with interleaved metadata 547 includes the graphics data that was present in the compressed graphics stream with interleaved metadata 503 depicted in FIG. 5, but omits the blocks that do not contain any valid graphics data (i.e., those blocks that contain only padding). The compacted compressed graphics stream with interleaved metadata 547 may therefore be transferred from a first GPU to a second GPU using lower resource overhead than would be required to transfer the compressed graphics stream with interleaved metadata 503 depicted in FIG. 5.

Figure 7:
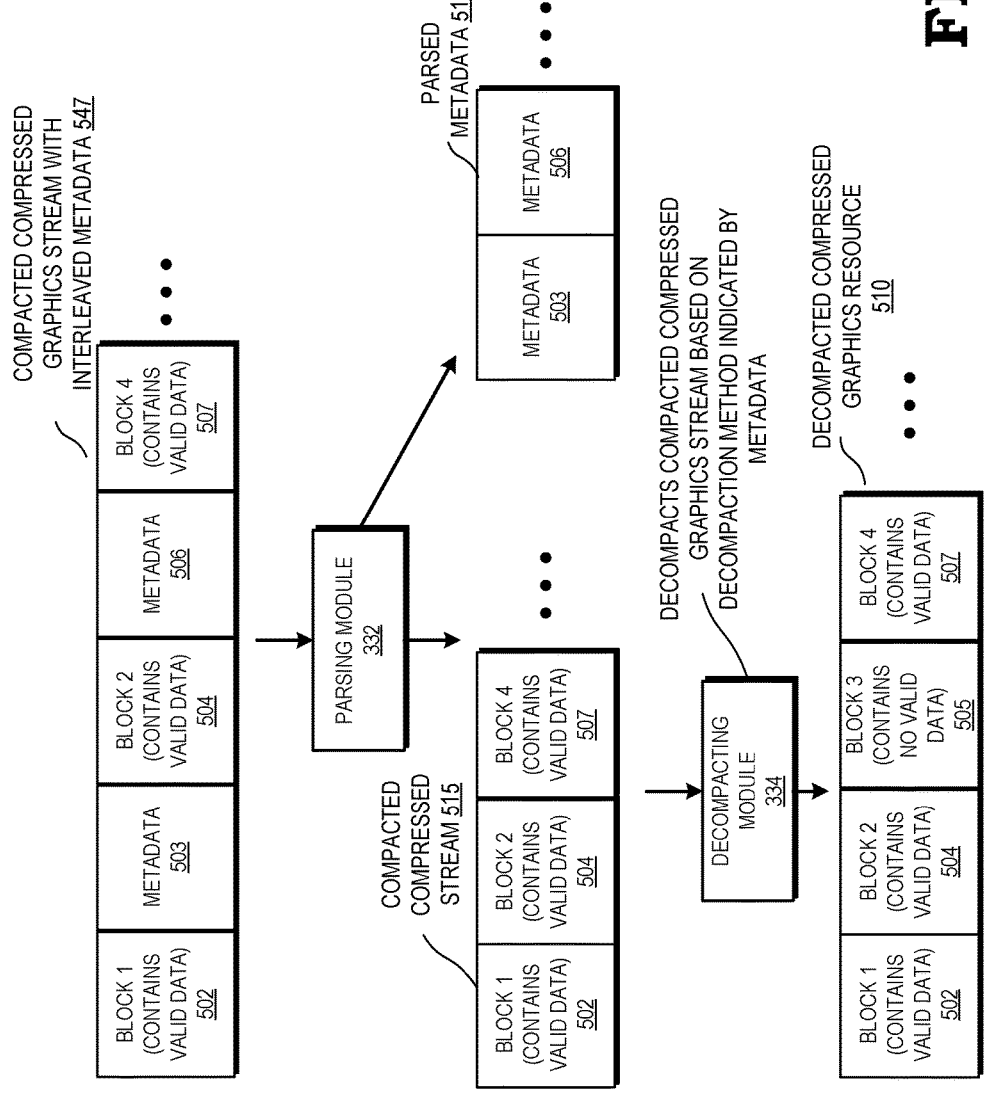
FIG. 7 is a block diagram of an example of a parsing module of a decompacting engine of FIG. 3 parsing interleaved metadata from a compacted compressed stream of graphics data and a decompacting module decompacting a compacted compressed stream of graphics data based on the parsed metadata in accordance with some embodiments.

FIG. 7 illustrates an example of a parsing module 332 of the decompacting engine 130 of FIG. 3 parsing interleaved metadata from a compacted compressed graphics stream with interleaved metadata 547 and a decompacting module 334 of the decompacting engine 130 decompacting a compacted compressed stream of graphics data based on the parsed metadata in accordance with some embodiments. The compacted compressed graphics stream with interleaved metadata 547 includes block 1 (502), metadata 503, block 2 (504), metadata 506, and block 4 (507). Each of block 1 (502), block 2 (504), and block 4 (507) contains only valid data, and does not contain padding. The parsing module 332 receives the compacted compressed graphics stream with interleaved metadata 547, and separates the metadata from the compacted compressed graphics data, resulting in a compacted compressed graphics stream 515 and parsed metadata 516. The compacted compressed graphics stream 515 includes block 1 (502), block 2 (504), and block 4 (507), and the parsed metadata 516 includes metadata 503 and metadata 506. The parsing module 332 stores the parsed metadata 516 and passes the compacted compressed graphics stream 515 to the decompacting module 334.

The decompacting module 334 receives the compacted compressed graphics stream 515 and decompacts the compacted compressed graphics stream 515 by inserting padding into the blocks of graphics data for data alignment. The decompacting module 334 determines the locations at which padding is to be inserted from the parsed metadata 516 processed by the parsing module 332. The resulting decompacted compressed graphics stream 510 includes the same blocks of graphics data and padding as the compressed graphics stream 510 depicted in FIG. 5.

Figure 8:
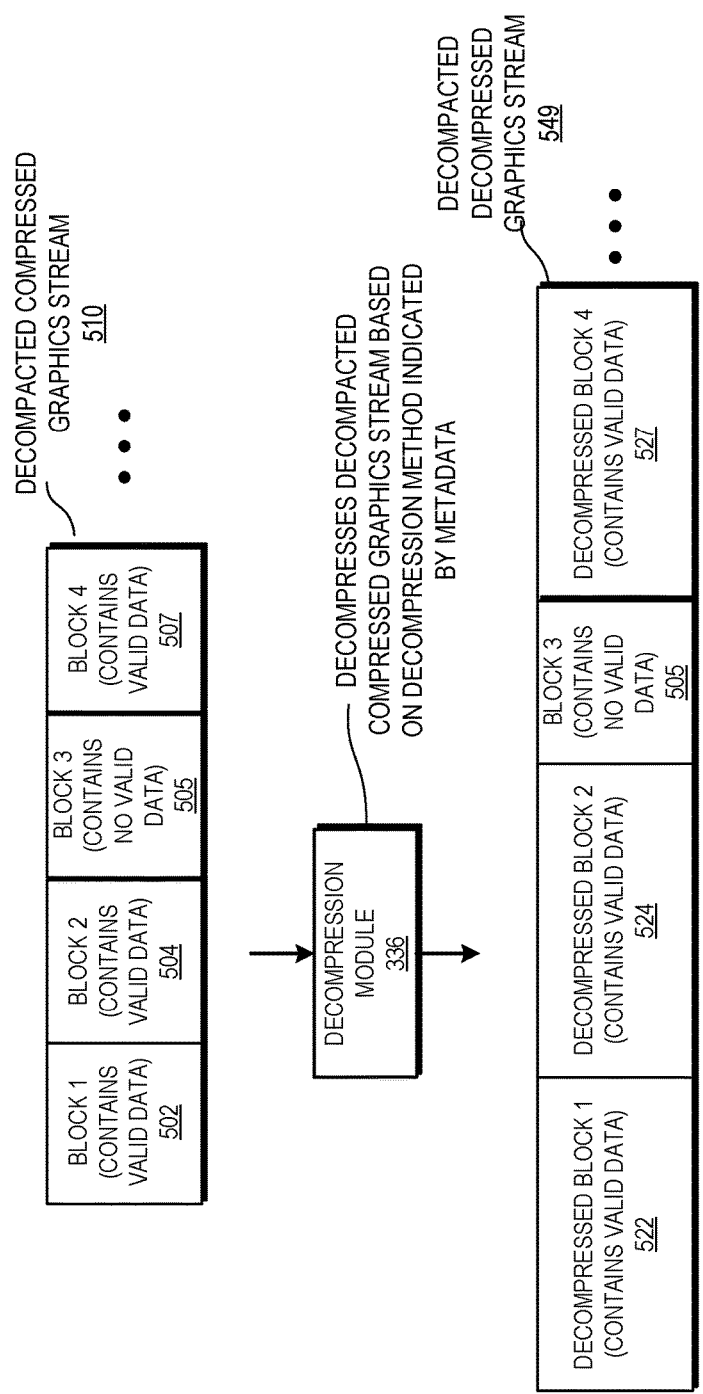
FIG. 8 is a block diagram of an example of a decompression module of a decompacting engine of FIG. 3 decompressing a decompacted compressed graphics stream in accordance with some embodiments.

FIG. 8 illustrates an example of an optional decompression module 336 of a decompacting engine of FIG. 3 decompressing a decompacted compressed graphics stream 510 in accordance with some embodiments. As described above with respect to FIG. 7, a compacted compressed graphics stream received by a receiving GPU is decompacted and reconstructed to be an equivalent compressed representation of the original graphics resource. In some embodiments, a stream compression module of the sending GPU performs additional compression before transferring the compacted compressed graphics stream to the receiving GPU. In some embodiments, the decompacted compressed graphics stream is decompressed at the receiving GPU. In the embodiment illustrated in FIG. 8, the decompacted compressed graphics stream 510 includes block 1 (502), block 2 (504), block 3 (505), and block 4 (507). Block 1 (502), block 2 (504), and block 4 (507) each contain only valid graphics data, and block 3 (505) contains only padding. The decompacted compressed graphics stream 510 is received by the decompression module 336. The decompression module 336 reads the parsed metadata (not shown) stored at the parsing module (not shown), and decompresses the compressed graphics stream 510 using a decompression method indicated by the metadata.

The resulting decompacted decompressed graphics stream 549 includes decompressed block 1 (522), decompressed block 2 (524), block 3 (505), and decompressed block 4 (527). Depending on the type of compressed graphics data included in the compressed graphics stream 510, the decompression module 336 may decompress the graphics data using varying decompression methods. For example, compressed color data may be decompressed using a color decompression method, while compressed depth data may be decompressed using a depth decompression method. Compressed vertex data may be decompressed using a vertex decompression method.

Figure 9:
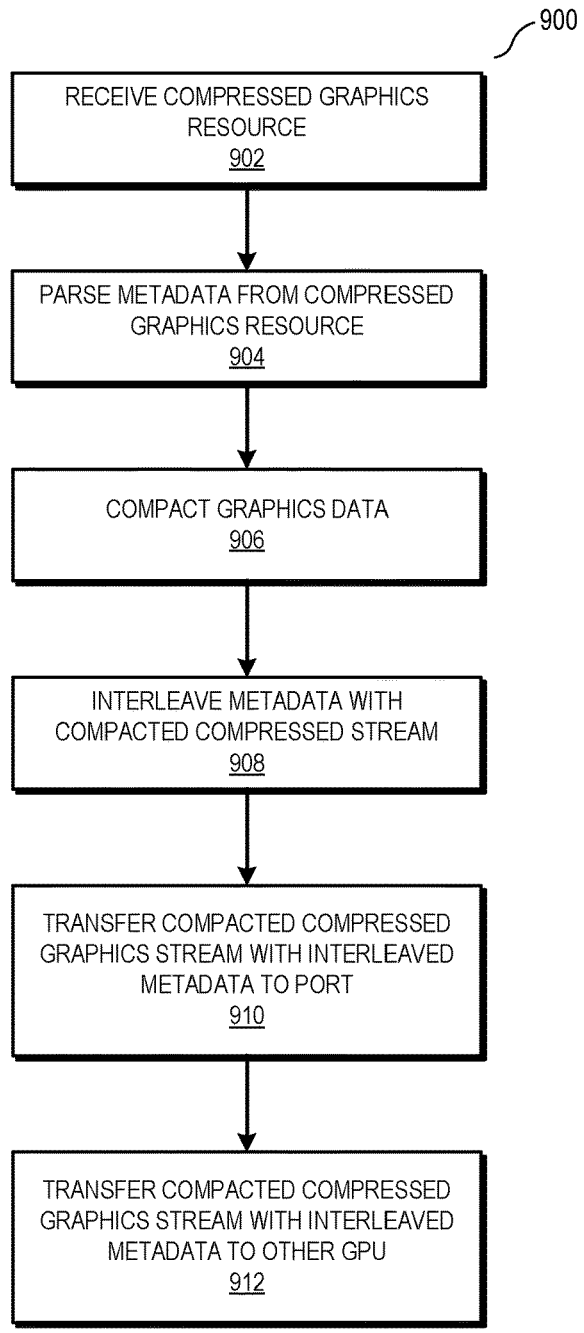
FIG. 9 is a flow diagram illustrating a method for compacting a compressed stream of graphics data and interleaving metadata for transfer between GPUs in a multi-GPU processing system in accordance with some embodiments.

FIG. 9 illustrates a method 900 for compacting a compressed graphics resource for transfer between GPUs in a multi-GPU processing system in accordance with some embodiments. For purposes of description, the method 900 is described with respect to an example implementation at the compacting engine 120 of FIGS. 1 and 2. At block 902, the compacting engine 120 receives a compressed graphics resource with interleaved metadata 203. At block 904, the parsing module 222 of the compacting engine 120 parses metadata from the compressed graphics resource with interleaved metadata 203 and stores the parsed metadata. In another embodiment, compressed graphics resource could have metadata stored separately, in which case metadata is loaded and parsed from another location associated with the compressed graphics resource. In some embodiments, a metadata reformatting module may optionally process the metadata and change its format. At block 906, the compacting module 224 of the compacting engine 120 compacts the compressed graphics stream. At block 908, the interleaving module 226 interleaves the parsed metadata stored at the parsing module 222 with the compacted compressed graphics stream to output a compacted compressed graphics stream with interleaved metadata 247. In some embodiments, the compacted compressed graphics stream with interleaved metadata 247 may be further stream-compressed by the stream compressor module 227. In some embodiments, the compacted compressed graphics stream and a metadata stream are independently compressed by the stream compressor module 227 prior to interleaving. At block 910, the compacted compressed graphics stream with interleaved metadata 247 is transferred from the compacting engine 120 to the port 140 of the GPU 110. At block 912, the compacted compressed graphics stream with interleaved metadata is transferred from the port 140 of the GPU 110 to the port 160 of the GPU 150.

Figure 10:
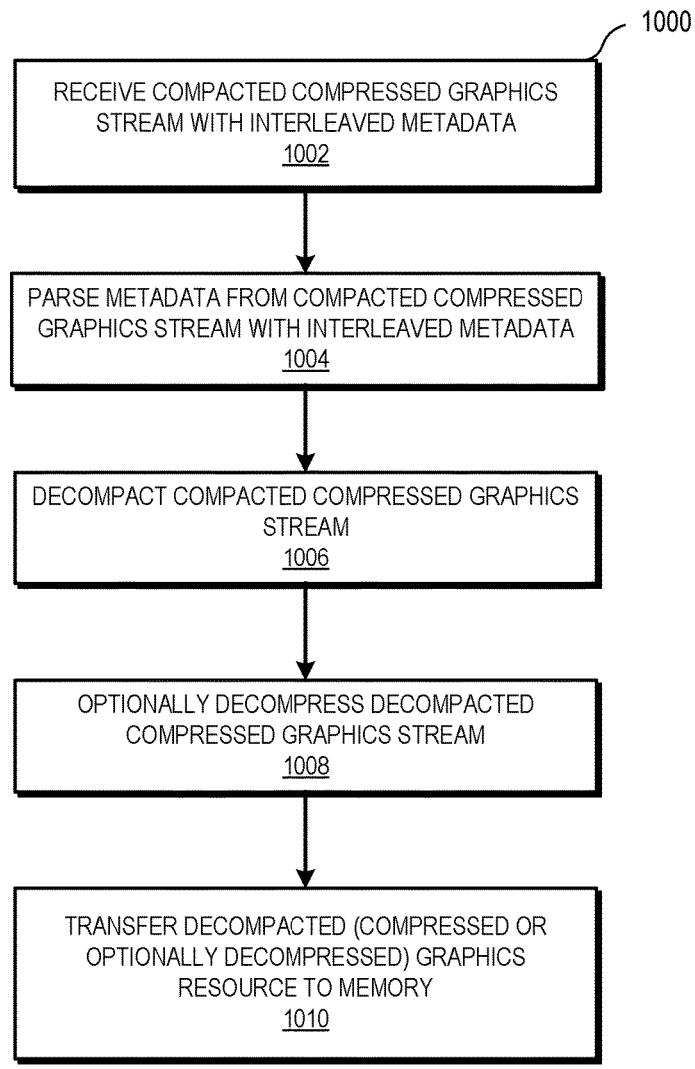
FIG. 10 is a flow diagram illustrating a method for decompacting and decompressing a compacted compressed graphics stream with interleaved metadata received by one GPU from another GPU for processing by the shaders of the receiving GPU.

FIG. 10 illustrates a method 1000 for decompacting and decompressing a compacted compressed graphics stream with interleaved metadata received at a GPU from another GPU in a multi-GPU processing system in accordance with some embodiments. For purposes of description, the method 1000 is described with respect to an example implementation at the decompacting engine 180 of FIGS. 1 and 3. At block 1002, the decompacting engine 180 receives a compacted compressed graphics stream with interleaved metadata 347 that was previously transferred to the port 160 of GPU 150 from the port 140 of GPU 110. At block 1004, the parsing module 332 of the decompacting engine 180 parses the metadata from the compacted compressed graphics stream with interleaved metadata 347 and stores the parsed metadata. If the received compacted compressed graphics stream with interleaved metadata 347 was stream-compressed, it is decompressed either prior to entering the parsing module or after exiting the parsing module, depending on whether stream compression occurred before or after interleaving. At block 1006, the compacted compressed graphics stream is passed to the decompacting module 334. The decompacting module 334 decompacts the compacted compressed graphics stream by inserting padding for data alignment as indicated by the parsed metadata stored at the parsing module 332. In some embodiments, the metadata reformatting module 333 is invoked, either to re-format the metadata for the receiving GPU (if the sending and receiving GPUs have different metadata storage formats), or to undo re-formatting of the metadata that was performed at the sending GPU to facilitate transfer to the receiving GPU. Optionally, at block 1008, the compressed graphics stream is passed to the decompression module 336, which decompresses the compressed graphics resource according to the decompression method or methods indicated by the parsed metadata stored at the parsing module 332. At block 1010, the decompacted compressed or decompressed graphics resource is passed from the decompacting engine 180 is stored in memory 155.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
compacting a first compressed stream of graphics data, wherein the first compressed stream of graphics data comprises a plurality of memory blocks, and wherein compacting comprises filtering out padding for data alignment from the plurality of memory blocks;
transferring from a first graphics processing unit (GPU) to a second GPU the first compacted compressed stream of graphics data;
transferring from the first GPU to the second GPU first metadata indicating a first method of compressing the first compacted compressed stream of graphics data; and
decompacting, at the second GPU, the first compacted compressed stream of graphics data, wherein decompacting comprises reinserting padding for data alignment into the plurality of memory blocks.

2. The method of claim 1, further comprising:
decompressing, at the second GPU, the first compacted compressed stream of graphics data based on the first method of compressing.

3. The method of claim 1, further comprising:
transferring from the first GPU to the second GPU a second compacted compressed stream of graphics data;
transferring from the first GPU to the second GPU second metadata indicating a second method of compressing the second compacted compressed stream of graphics data; and
decompressing, at the second GPU, the second compacted compressed stream of graphics data based on the second method of compressing.

4. The method of claim 3, wherein the first method of compressing is different from the second method of compressing.

5. The method of claim 1, wherein the first method of compressing comprises a method for compressing color data.

6. The method of claim 1, wherein the first method of compressing comprises a method for compressing depth data.

7. The method of claim 1, wherein the first method of compressing comprises a method for compressing vertex data.

8. The method of claim 1, further comprising:
transferring from the second GPU to the first GPU a third compacted compressed stream of graphics data;
transferring from the second GPU to the first GPU third metadata indicating a third method of decompressing the third compressed stream of graphics data; and
decompressing, at the first GPU, the third compacted compressed stream of graphics data based on the third method of decompressing.

9. A method, comprising:
parsing first metadata associated with a first compressed graphics stream comprising a plurality of memory blocks of graphics data, wherein the first metadata indicates a first compression method for the first compressed graphics stream;
compacting the first compressed graphics stream, wherein compacting comprises removing padding for data alignment from the memory blocks;
interleaving the first metadata with the compacted first compressed graphics stream;
transmitting the compacted first compressed graphics stream and the interleaved first metadata from a first graphics processing unit (GPU) to a second GPU; and
decompacting, at the second GPU, the first compacted compressed stream of graphics data, wherein decompacting comprises reinserting padding for data alignment into the plurality of memory blocks.

10. The method of claim 9, further comprising:
decompressing, at the second GPU, the compacted first compressed stream of graphics data based on the first compression method indicated by the first metadata.

11. The method of claim 9, further comprising:
parsing second metadata associated with a second compressed graphics stream comprising memory blocks of graphics data, wherein the second metadata indicates a second compression method for the second compressed graphics stream;
compacting the second compressed graphics stream, wherein compacting comprises removing padding from the memory blocks;
interleaving the second metadata with the compacted first second compressed graphics stream; and
transmitting the compacted second compressed graphics stream and the interleaved second metadata from the first GPU to the second GPU.

12. The method of claim 11, wherein the first compression method is different from the second compression method.

13. The method of claim 9, wherein the first compression method comprises a method for compressing color data.

14. The method of claim 9, wherein the first method of compressing comprises a method for compressing depth data.

15. The method of claim 9, wherein the first method of compressing comprises a method for compressing vertex data.

16. A device, comprising:
a plurality of graphics processing units (GPUs), each GPU comprising:
a compacting engine configured to:
parse first metadata from a first compressed stream of graphics data comprising a plurality of memory blocks of graphics data, wherein the first metadata indicates a first compression method for the first compressed graphics stream;
compact the first compressed graphics stream, wherein compacting comprises removing padding for data alignment from the memory blocks;
interleave the first metadata with the compacted first compressed graphics stream; and
transmit the compacted first compressed graphics stream and the interleaved first metadata from a first GPU of the plurality of GPUs to a second GPU of the plurality of GPUs; and
a decompacting engine configured to:
receive a compacted second compressed graphics stream and second metadata, wherein the second metadata indicates a second compression method for the compacted second compressed graphics stream; and decompact the compacted second compressed graphics stream, wherein decompacting comprises reinserting padding for data alignment into the plurality of memory blocks.

17. The device of claim 16, wherein the decompacting engine of each GPU is further configured to:
    decompress the decompacted second compressed graphics stream based on the second compression method.

18. The device of claim 17, wherein the first compression method is different from the second compression method.

19. The device of claim 16, wherein the first compression method comprises a method for compressing color data.

20. The device of claim 16, wherein the first compression method comprises a method for compressing depth data.

* * * * *